United States Patent
Hoffmann

(10) Patent No.: US 11,549,765 B2
(45) Date of Patent: Jan. 10, 2023

(54) COOLANT CIRCUIT FOR A DRIVE DEVICE AND METHOD FOR OPERATING A COOLANT CIRCUIT

(71) Applicant: AUDI AG, Ingolstadt (DE)

(72) Inventor: Thomas Hoffmann, Riedenburg (DE)

(73) Assignee: AUDI AG, Ingolstadt (DE)

( * ) Notice: Subject to any disclaimer, the term of this patent is extended or adjusted under 35 U.S.C. 154(b) by 37 days.

(21) Appl. No.: 16/910,465

(22) Filed: Jun. 24, 2020

(65) Prior Publication Data

US 2020/0400393 A1 Dec. 24, 2020

(30) Foreign Application Priority Data

Jun. 24, 2019 (DE) .................... 102019209115.6

(51) Int. Cl.
*F28F 27/02* (2006.01)
*F01P 7/16* (2006.01)
(Continued)

(52) U.S. Cl.
CPC .............. *F28F 27/02* (2013.01); *B60K 11/02* (2013.01); *F01P 5/10* (2013.01); *F01P 7/161* (2013.01); *H02K 9/19* (2013.01); *F01P 2005/105* (2013.01); *F01P 2007/146* (2013.01); *F28F 2250/08* (2013.01)

(58) Field of Classification Search
CPC .... B60K 11/02; B60K 1/00; B60K 2001/005; B60K 2001/006; F01P 2005/105; F01P 2007/146; F01P 5/10; F01P 7/161; F01P 7/164; F01P 7/165; F28F 2250/08; F28F 27/02; H02K 9/19
See application file for complete search history.

(56) References Cited

U.S. PATENT DOCUMENTS

| 5,481,873 A | 1/1996 | Saruwatari et al. |
| 2004/0000161 A1 | 1/2004 | Khelifa et al. |
| (Continued) | | |

FOREIGN PATENT DOCUMENTS

| CN | 201103451 Y | 8/2008 |
| CN | 101368504 A | 2/2009 |
| (Continued) | | |

OTHER PUBLICATIONS

German Search Report dated Mar. 11, 2020 in corresponding German Application No. 102019209115.6; 16 pages; Machine translation attached.

(Continued)

*Primary Examiner* — Grant Moubry
*Assistant Examiner* — Ruben Picon-Feliciano
(74) *Attorney, Agent, or Firm* — Maier & Maier, PLLC

(57) ABSTRACT

A coolant circuit for a drive device. It includes a first coolant sub-circuit and a second coolant sub-circuit, in each of which a device to be temperature-controlled is arranged and which are fluidically connected to one another via at least one connecting valve, wherein at least one coolant pump is provided in each of the two coolant sub-circuits, which is designed in at least one of the coolant sub-circuits as a fluid pump having variable delivery direction. The disclosure furthermore relates to a method for operating a coolant circuit for a drive device.

17 Claims, 1 Drawing Sheet

(51) Int. Cl.
  *F01P 5/10*   (2006.01)
  *H02K 9/19*   (2006.01)
  *B60K 11/02*  (2006.01)
  *F01P 7/14*   (2006.01)

(56) References Cited

U.S. PATENT DOCUMENTS

| | | | |
|---|---|---|---|
| 2009/0038563 A1* | 2/2009 | Takarai | F01P 7/164 123/41.02 |
| 2010/0293966 A1* | 11/2010 | Yokomachi | B60H 1/02 62/3.2 |
| 2012/0111888 A1* | 5/2012 | Smith | F01N 3/2066 222/129.1 |
| 2012/0151919 A1 | 6/2012 | Bartosch et al. | |
| 2012/0247126 A1* | 10/2012 | Murase | B60H 1/00478 62/3.3 |
| 2014/0234124 A1* | 8/2014 | Ruhle | F16H 57/0441 417/53 |
| 2015/0010392 A1* | 1/2015 | Lazich | F04D 29/628 15/170.1 |
| 2018/0119649 A1* | 5/2018 | Obergfaell | F02M 25/0221 |
| 2019/0039434 A1* | 2/2019 | Wallace | B60H 1/00392 |

FOREIGN PATENT DOCUMENTS

| | | |
|---|---|---|
| CN | 102042069 A | 5/2011 |
| CN | 102374008 A | 3/2012 |
| CN | 103061847 A | 4/2013 |
| CN | 104295368 A | 1/2015 |
| CN | 105156357 A | 12/2015 |
| DE | 2905824 A1 | 11/1980 |
| DE | 4014636 A1 | 7/1992 |
| DE | 10126482 A1 | 12/2002 |
| DE | 10146313 A1 | 4/2003 |
| DE | 10234087 A1 | 2/2004 |
| DE | 102008034502 A1 | 2/2009 |
| DE | 102008032130 A1 | 1/2010 |
| DE | 102010011477 A1 | 9/2011 |
| DE | 102011003206 A1 | 7/2012 |
| DE | 102012221358 B3 | 2/2014 |
| DE | 102014101044 A1 | 8/2014 |
| DE | 102013223899 B3 | 2/2015 |
| DE | 112014003502 T5 | 4/2016 |
| DE | 112014005146 T5 | 8/2016 |
| DE | 102016118688 A1 | 6/2017 |
| EP | 2014889 A1 | 1/2009 |
| JP | 2018131927 A | 8/2018 |

OTHER PUBLICATIONS

Office Action dated Nov. 17, 2021, in connection with corresponding Chinese Application No. 202010567197.2 (12 pp., including machine-generated English translation).

Office Action dated May 16, 2022 in corresponding Chinese Application No. 202010567197.2; 14 pages including English-language translation.

* cited by examiner

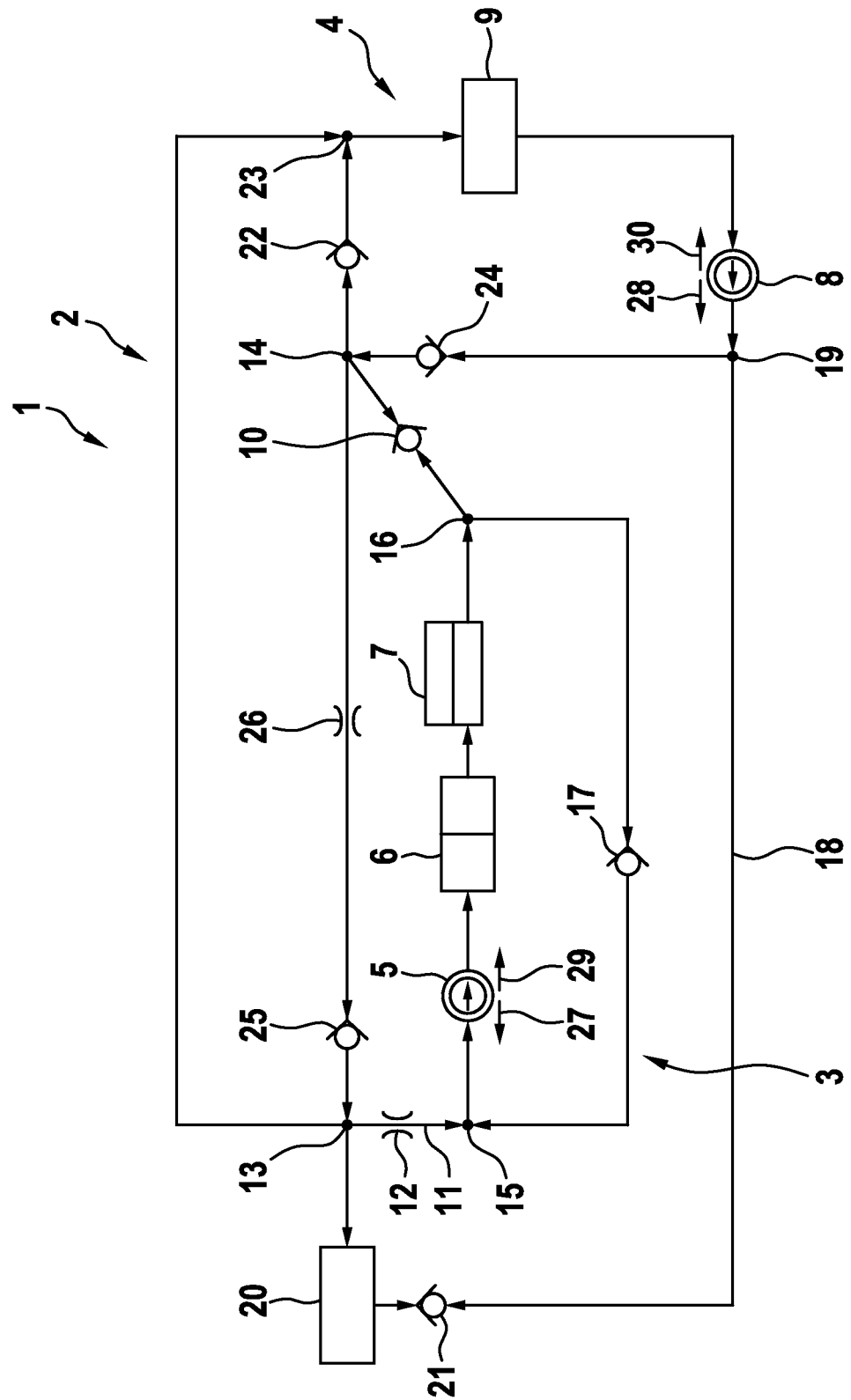

COOLANT CIRCUIT FOR A DRIVE DEVICE AND METHOD FOR OPERATING A COOLANT CIRCUIT

FIELD

The disclosure relates to a coolant circuit for a drive device and a method for operating such a coolant circuit.

BACKGROUND

For example, the document DE 10 2010 011 477 A1 is known from the prior art. It describes an internal combustion engine having dry sump lubrication, which comprises a cylinder crankcase and an oil pump driven by the internal combustion engine having at least one suction pump stage and a pressure pump stage, wherein the at least one suction pump stage and the pressure pump stage are arranged inside the cylinder crankcase in a shared pump housing. In order to reduce the weight of the oil pump, it is proposed that the pump housing be an integral part of an oil pan or a lower part of the cylinder crankcase.

SUMMARY

It is an object of the invention to propose a coolant circuit for a drive device which has advantages over known coolant circuits, in particular manages with a reduced number of active components, in particular active control elements, and has very high efficiency.

This is achieved according to the disclosure by a coolant circuit for a drive. The coolant circuit is distinguished by a first coolant sub-circuit and a second coolant sub-circuit, in each of which a device to be temperature-controlled is arranged and which are fluidically connected to one another via at least one connecting valve, in particular a connecting check valve, wherein at least one coolant pump is present in each of the two coolant sub-circuits, which is designed in at least one of the coolant sub-circuits as a fluid pump having variable delivery direction, in particular as a screw pump.

The drive device is used, for example, to drive a motor vehicle, in this regard thus to provide a drive torque directed toward driving the motor vehicle. The drive torque is generated with the aid of a drive assembly of the drive device, wherein the drive assembly is designed as or comprises, for example, an internal combustion engine or an electric machine. The drive assembly can additionally or alternatively comprise a fuel cell. In any case, the drive assembly is a heat-generating drive assembly, so that during operation of the drive device, heat arises in or on the drive assembly, which has to be dissipated therefrom at least temporarily.

A supply of heat can also be provided additionally or alternatively. If both the dissipation and also the supply of heat are provided, this can thus be referred to as temperature control. When reference is made in the scope of this description to a dissipation of heat, this is thus always representative of dissipation and/or supply of heat or generally speaking of temperature control. The temperature control of the heat is carried out in particular in such a way that a temperature of the drive device or the drive assembly adjusts to an operating temperature of the drive device or the drive assembly or falls below it. The temperature of the drive device, in particular the temperature of the drive assembly, is preferably regulated to the corresponding operating temperature.

The dissipation and/or supply of the heat is carried out with the aid of the coolant circuit or by means of the coolant provided in the coolant circuit, which contains water, for example. The coolant circuit is preferably set in such a way that it provides a cooling capacity for cooling the drive device which keeps the temperature of the drive device at or below the operating temperature. For example, the cooling capacity of the coolant circuit is effectuated by setting at least one of the coolant pumps, for example, by setting the speed of the at least one coolant pump.

The higher the speed of the coolant pump, the greater the coolant volume flow that is circulated in the coolant circuit. Correspondingly, the cooling capacity of the coolant circuit typically increases with the speed of the coolant pump, at least if the boundary conditions remain the same. If reference is made in the scope of this description to the cooling capacity, it is thus to be noted that this term is also understood as the capacity of the coolant circuit, independently of whether it is used for dissipating or supplying heat. Instead of the term cooling capacity, reference can thus be made more generally to temperature-control capacity.

Different devices frequently have to be cooled or temperature-controlled differently in the scope of the drive device. For this reason, the coolant circuit comprises the first coolant sub-circuit and the second coolant sub-circuit. The first coolant sub-circuit is used, for example, for the temperature control of a first device of the drive device and the second coolant sub-circuit is used for the temperature control of a second device of the drive device. It can be provided that both the first device and also the second device are each present as a heat-generating device. Alternatively, it can be provided that the first device is designed as a heat-generating device and the second device as a heat-absorbing device, or vice versa.

As already explained, the heat-generating device is to be understood as a device during the operation of which heat arises, which is dissipated or has to be dissipated by means of the coolant circuit. In contrast, the heat-absorbing device is understood as a device which is heated with the aid of the coolant circuit, for example, by supplying heat of the first device thereto via the coolant circuit. For this purpose, it is necessary for coolant and, accordingly, heat to be exchangeable between the first coolant sub-circuit and the second coolant sub-circuit or vice versa. For this reason, the first coolant sub-circuit and the second coolant sub-circuit are fluidically connected to one another via the at least one connecting valve. Coolant can thus be exchanged at least temporarily, namely when the connecting valve is open, between the coolant sub-circuits.

The connecting valve can be designed, for example, as a controllable valve, which is actuatable by means of a control signal, in particular an electric control signal. The connecting valve can thus be intentionally opened and closed. The controllable valve is preferably a solenoid valve. The connecting valve is particularly preferably designed as a connecting check valve. This means that coolant can flow over at any time in at least one direction, namely, for example, from the first coolant sub-circuit into the second coolant sub-circuit or vice versa from the second coolant sub-circuit into the first coolant sub-circuit.

The two coolant sub-circuits, i.e., the first coolant sub-circuit and the second coolant sub-circuit, are preferably operable independently of one another. For this purpose, the at least one coolant pump is provided in each of the two coolant sub-circuits. In other words, at least one first coolant pump is provided in the first coolant sub-circuit and at least one second coolant pump is provided in the second coolant sub-circuit. The exchange of the coolant between the coolant sub-circuits is preferably adjustable, namely in particular by means of the coolant pumps.

For this reason, it is advantageous to design the coolant pump in at least one of the coolant sub-circuits as a fluid pump having variable delivery direction, in particular as a screw pump.

The fluid pump having variable delivery direction is to be understood as a fluid pump in which the delivery direction can be changed, for example, by reversing the rotational direction. The fluid pump is preferably operated temporarily using a first delivery direction and temporarily using a second delivery direction opposite to the first delivery direction. The fluid pump is particularly preferably designed as a screw pump. This additionally has the advantage that in the stationary state, i.e., at a speed of zero, it has a very high flow resistance, in particular is fluid-tight or at least nearly fluid-tight. This means that when the screw pump is at a standstill, no fluid can pass through it.

The screw pump operates according to the displacement principle or is provided as a displacement pump. In this way, a high dynamic range of the coolant circuit is achieved in comparison to other pump types, for example, flow pumps, which are typically used in this area. This means that the coolant circuit is adjustable by a speed change of the screw pump significantly faster to a changed operating point of the drive device than is the case with other pump types.

Moreover, the screw pump offers a higher efficiency in comparison to the other pump types and has very good acoustic behavior. Screw pumps have heretofore not been used as coolant pumps, inter alia, because they have weaknesses in the typical operating ranges of normal drive devices. Screw pumps are thus usually less suitable for high volume flows and low counter pressures, as occur in coolant circuits of typical drive devices, for example. Therefore centrifugal pumps have mainly been used up to now.

However, the screw pump has the advantage that a flow direction through the coolant circuit or at least through the respective coolant sub-circuit can be readily reversed. It can thus be provided that the screw pump is temporarily operated using a first flow direction or delivery direction and temporarily using a second flow direction or delivery direction opposite to the first flow direction. The reverse flow direction is achieved in a simple manner, for example, by reversing the rotational direction.

The fluid pump having variable delivery direction, in particular the screw pump, can in principle be used as the coolant pump of the first coolant circuit or as the coolant pump of the second coolant circuit. It can obviously also be provided that both the coolant pump of the first coolant sub-circuit and also the coolant pump of the second coolant sub-circuit are each provided as a fluid pump having variable delivery direction or a screw pump. In the latter case, the described advantages of the fluid pump having variable delivery direction or the screw pump are used profitably in both coolant sub-circuits.

The connecting valve, which is arranged between the coolant sub-circuits, preferably opens in the direction of the first coolant sub-circuit in the design as a connecting check valve. This means that coolant can pass from the second coolant sub-circuit into the first coolant sub-circuit via the connecting valve, but a passage through the connecting valve in the reverse direction is prevented. For example, it is provided in this manner that the temperature present in the first coolant sub-circuit is equalized to the temperature of the second coolant sub-circuit. The coolant sub-circuits are particularly preferably each only fluidically connected to one another via the elements mentioned in the scope of this description, in any case not via an active control element, for example, a solenoid valve or the like.

One refinement of the invention provides that the first coolant sub-circuit and the second coolant sub-circuit are fluidically connected to one another separately from the at least one connecting valve via a connecting line. The connecting line is connected, on the one hand, spaced apart from the connecting valve to the first coolant sub-circuit and, on the other hand, spaced apart from the connecting valve to the second coolant sub-circuit. In principle, coolant can be exchanged freely between the coolant sub-circuits via the connecting line. However, such an exchange typically takes place only for pressure equalization if coolant passes via the connecting valve from one of the coolant sub-circuits into the respective other one of the coolant sub-circuits.

If, for example, coolant flows out of the second coolant sub-circuit into the first coolant sub-circuit via the connecting valve, a corresponding quantity of coolant is thus displaced via the connecting line from the first coolant sub-circuit into the second coolant sub-circuit and vice versa. In this respect, a reliable pressure equalization between the coolant sub-circuits is achieved via the connecting line. A flow restrictor, which represents a flow resistance, is particularly preferably arranged in the connecting line. The flow restrictor prevents an undesired exchange of coolant between the coolant sub-circuits when the connecting valve is closed. The two sub-circuits are preferably fluidically connected to one another exclusively via the connecting valve and the connecting line.

One refinement of the invention provides that at least one circulation valve, in particular a first circulation check valve, is arranged in the first coolant sub-circuit, which is fluidically connected in series to the coolant pump and the device to be temperature-controlled of the first coolant sub-circuit. This first circulation valve enables, for example, different operating modes of the coolant circuit with different delivery directions of the coolant pump of the first coolant sub-circuit. If the coolant pump of the first coolant sub-circuit conveys the coolant in the first coolant sub-circuit in the direction in which the first circulation valve opens, the coolant is thus circulated in the first coolant sub-circuit. For this purpose, the circulation valve is preferably designed as a circulation check valve. An embodiment as a controlled valve, in particular as a solenoid valve, can also be provided, however.

With reversed delivery direction of the coolant pump of the first coolant sub-circuit, it conveys the coolant in the first coolant sub-circuit against the closed first circulation valve, in particular against the closed first circulation check valve. In this way, the coolant is displaced, for example, through the connecting line and/or the connecting valve, out of the first coolant sub-circuit into the second coolant sub-circuit. If this takes place via the connecting line, coolant thus flows out of the second coolant sub-circuit via the connecting valve into the first coolant sub-circuit to produce a pressure equalization. If the displacement of the coolant out of the first coolant sub-circuit takes place via the connecting valve, coolant thus flows out of the second coolant sub-circuit via the connecting line back into the first coolant sub-circuit. The described design enables a high flexibility of the coolant circuit without using active elements such as active switching valves or the like.

One refinement of the invention provides that the connecting line is connected to the first coolant sub-circuit on a side of the coolant pump of the first coolant sub-circuit facing away from the device to be temperature-controlled, and/or the connecting valve is connected to the first coolant sub-circuit on a side of the device to be temperature-controlled facing away from the coolant pump. For example, it is thus provided that the coolant pump and the device to be temperature-controlled are fluidically in succession in the first coolant sub-circuit.

On the one hand, this arrangement of device to be temperature-controlled and coolant pump is fluidically connected to the connecting line and, on the other hand, it is fluidically connected to the connecting valve on the first coolant sub-circuit. The first circulation valve is particularly preferably located fluidically in parallel to this arrangement of device to be temperature-controlled and coolant pump. It is thus arranged, for example, between the connection points of the connecting line and the connecting valve on the first coolant circuit in the circuit. The particularly flexible operation which was already described thus results.

One refinement of the invention provides that the connecting line is fluidically connected at a first connection point and/or the connecting valve is fluidically connected at a second connection point to the second coolant sub-circuit. In other words, the connecting line opens at the first connection point or the connecting valve opens at the second connection point, respectively, into the second coolant sub-circuit. The first connection point and the second connection point are different from one another and are spaced apart from one another within the second coolant sub-circuit. The described exchange of the coolant between the coolant sub-circuits is enabled in a particularly simple manner in this way.

One refinement of the invention provides that a branch line branches off from the second coolant sub-circuit at a branching point and opens into the second coolant sub-circuit at the first connection point. The branch line is thus fluidically connected, on the one hand, at the branching point and, on the other hand, at the first connection point. The second coolant sub-circuit is already self-contained without this branching line, and thus enables independent operation or independent circulation of coolant in the second coolant sub-circuit, in particular only in the second coolant sub-circuit. Part of the second coolant sub-circuit can now be bypassed via the branch line. In other words, the branch line is provided fluidically in parallel to a region of the second coolant sub-circuit. It is provided, for example, that the first coolant sub-circuit and/or the second coolant sub-circuit are operated, i.e., coolant is circulated therein, without the coolant flowing through the branch line. However, such a flow through the branch line takes place at least temporarily, namely while bypassing a region of the second coolant sub-circuit. This ensures particularly flexible operation of the coolant circuit.

One refinement of the invention provides that at least one heat exchanger and/or a branch line valve, in particular a branch line check valve opening in the direction of the branching point, is provided in the branch line. The heat exchanger is particularly preferably designed as a radiator, in particular as a vehicle radiator of the motor vehicle. The coolant present in the coolant circuit can be temperature-controlled with the aid of the heat exchanger. The coolant is particularly preferably cooled at least temporarily with the aid of the heat exchanger.

The heat exchanger can be bypassed, for example, by means of a bypass line, which opens into the branch line on both sides of the heat exchanger. A control element is preferably arranged in the bypass line, in particular a control element which adjusts a flow cross-section of the bypass line in dependence on a temperature, in particular a temperature of the coolant in the branch line and/or the bypass line. The control element can be provided as a solenoid valve or as a passive control element, in particular as a wax thermostat.

Additionally or alternatively to the heat exchanger, the branch line valve is provided in the branch line. The branch line valve is preferably designed as a branch line check valve. However, an embodiment as a control valve, in particular as a solenoid valve, can also be provided. The branch line check valve preferably opens in the direction of the branching point. In other words, the branch line valve permits flow through the branch line from the direction of the first connection point toward the branching point and prevents flow through the branch line in the opposite direction. With the aid of the branch line valve, a control of the flow through the branch line is implemented in a simple manner.

One refinement of the invention provides that a second circulation valve, in particular a circulation check valve, bypassing the corresponding coolant pump and the corresponding device to be temperature-controlled is provided in the second coolant sub-circuit. A region of the second coolant sub-circuit, in which both the coolant pump and also the device to be temperature-controlled of the second coolant sub-circuit are provided, can thus be bypassed with the aid of the second circulation valve. The second circulation valve can be provided as a controlled valve, in particular a solenoid valve. However, a design as a circulation check valve is preferred. With corresponding flow direction of the coolant, the coolant will thus flow through the second circulation valve or circulation check valve, so that it is guided past the coolant pump and the device to be temperature-controlled of the second coolant sub-circuit. When the flow direction is reversed, however, the second circulation valve or circulation check valve is closed, so that the coolant flows through the coolant pump and the device to be temperature-controlled, at least if the coolant pump is operated accordingly. Again, a high flexibility of the coolant circuit is achieved without active elements.

One refinement of the invention provides that the second circulation valve is fluidically connected to the second coolant sub-circuit, on the one hand, to the second connection point and, on the other hand, to the side of the device to be temperature-controlled of the second coolant sub-circuit facing away from the coolant pump. This means that the second connection point, on the one hand, of the arrangement of the coolant pump and the device to be temperature-controlled of the second coolant sub-circuit is provided therein, while in contrast a further connection point, at which the second circulation valve is connected to the second coolant sub-circuit on its side facing away from the second connection point, is arranged on the other side of the arrangement.

In this way, the coolant pump and the device to be temperature-controlled can be bypassed in a simple manner and at the same time an exchange of the coolant between the first coolant sub-circuit and the second coolant sub-circuit is enabled in a particularly advantageous manner. For example, it is provided that the second circulation valve is designed as a circulation check valve and opens in the direction of the second connection point. The second circulation valve thus again enables different operating modes of the coolant circuit with different delivery directions of the coolant pump of the second coolant sub-circuit.

One refinement of the invention provides that a third circulation valve, in particular a circulation check valve, is fluidically arranged between the coolant pump and the second connection point, and/or a fourth circulation valve, in particular a circulation check valve, is fluidically arranged between the first connection point and the second connection point in the second coolant sub-circuit. Both the third circulation valve and also the fourth circulation valve are used to increase a flexibility of the coolant circuit and to represent different operating modes. The third circulation valve and/or the fourth circulation valve can each be designed as a control valve, in particular as a solenoid valve.

However, a design of the third circulation valve as a circulation check valve is particularly preferably provided in such a way that the third circulation check valve opens in the direction of the second connection point. Accordingly, the third circulation check valve closes in the opposite direction. For the fourth circulation valve designed as a circulation check valve, it is preferably provided that it opens in the direction of the first connection point. Here too, the fourth circulation check valve closes in the opposite direction. This enables an extremely flexible operation of the coolant circuit without active elements.

The invention furthermore relates to a method for operating a coolant circuit for a drive device, in particular a coolant circuit according to the statements in the scope of this description. The coolant circuit on which the method is based is distinguished by a first coolant sub-circuit and a second coolant sub-circuit, in each of which a device to be temperature-controlled is arranged and which are fluidically connected to one another via at least one connecting valve, in particular a connecting check valve. At least one coolant pump is present in each of the two coolant sub-circuits, which is designed in at least one of the coolant sub-circuits as a fluid pump having variable delivery direction, in particular as a screw pump. It is provided that at least one operating parameter is selected from different operating parameters of at least one of the coolant pumps and set at the coolant pump.

The advantages of such a procedure or of such a design of the coolant circuit have already been indicated. Both the coolant circuit and also the method for its operation can be refined according to the statements in the scope of this description, so that reference is thus made thereto.

BRIEF DESCRIPTION OF THE DRAWINGS

The invention is explained in greater detail hereinafter on the basis of the exemplary embodiments illustrated in the drawing, without restricting the invention. In the single FIGURE, FIG. 1:

FIG. 1 shows a schematic illustration of a coolant circuit for a drive device.

DETAILED DESCRIPTION

The FIGURE shows a schematic illustration of a coolant circuit 1 for a drive device 2, which is only indicated. The coolant circuit 1 comprises a first coolant sub-circuit 3 and a second coolant sub-circuit 4. A first coolant pump 5 and a first device 6 to be temperature-controlled are arranged in the first coolant sub-circuit 3. In addition, in the exemplary embodiment illustrated here, a solely optional chiller 7 is provided in the first coolant circuit 3. A second coolant pump 8 and a second device 9 to be temperature-controlled are arranged in the second coolant sub-circuit 4.

The first device 6 is, for example, an energy accumulator, in particular a battery, particularly preferably a traction battery. In contrast, the second device 9 is preferably a drive assembly of the drive device 2, for example an internal combustion engine or an electric machine. In the latter case, the first device 6 embodied as an energy accumulator is preferably used to operate the electric machine. For this purpose, the electric machine is electrically connected to the energy accumulator.

The first coolant sub-circuit 3 and the second coolant sub-circuit 4 are operable independently of one another in principle, namely by corresponding operation of the respective coolant pump 5 or 8. This means that coolant can be circulated in each one of the coolant sub-circuits 3 and 4 independently of the respective other one of the coolant sub-circuits 3 or 4. However, they are also operable in such a way that coolant is exchanged between the coolant sub-circuits 3 and 4. The coolant sub-circuits 3 and 4 are fluidically connected to one another via a connecting valve 10 and a connecting line 11 for such an exchange of the coolant. The connecting valve 10 is designed here as a connecting check valve, for example. According to the exemplary embodiment shown here, a flow restrictor 12 is present in the connecting line 11.

It is apparent that the connecting line 11 is fluidically connected at a first connection point 13 and the connecting valve 10 is fluidically connected at a second connection point 14 to the second coolant sub-circuit 4. In this case, the connecting line 11 branches off at a connection point 15 and the connecting valve 10 branches off at a connection point 16 from the first coolant sub-circuit 3. In other words, the connecting line 11 connects the connection point 15 of the first coolant sub-circuit 3 to the first connection point 13 of the second coolant sub-circuit 4, whereas the connecting valve 10 fluidically connects the connection point 16 of the first coolant sub-circuit 3 to the second connection point 14 of the second coolant sub-circuit 4 at least temporarily.

A first circulation valve 17 is present in the first coolant sub-circuit 3, embodied here as a circulation check valve, for example. It is arranged between the connection points 15 and 16, namely on a side of the connection points 15 and 16 opposite to the first coolant pump 5, the first device 6 and optional chiller. In other words, this means that the connection points 15 and 16 of the first coolant sub-circuit 3 are fluidically connected to one another, on the one hand, via the first coolant pump 5, the first device 6, and optional chiller and, on the other hand, via the first circulation valve 17.

A branch line 18, which branches off at a branching point 19 from the second coolant sub-circuit 4 and opens back into it at the first connection point 13, is associated with the second coolant sub-circuit 4. A heat exchanger 20 and a branch line valve 21 are arranged in the branch line 18. The branch line valve 21 is present here, for example, as a branch line check valve. Furthermore, a second circulation valve 22, which bypasses the second coolant pump 8 and the second device 9, is arranged in the second coolant sub-circuit 4. This finally means that the second circulation valve 22 is provided fluidically in parallel to the second coolant pump 8 and the second device 9 in the second coolant sub-circuit 4. The second circulation valve 21 is preferably fluidically connected in this case, on the one hand, at the second connection point 14 and, on the other hand, at a connection point 23, which is arranged on the side of the second device 9 facing away from the second coolant pump 8. The second circulation valve 22 is also provided, for example, as a circulation check valve.

A third circulation valve 24 is present fluidically between the second coolant pump 8 and the second connection point 14. In contrast, a fourth circulation valve 25 is fluidically arranged between the first connection point 13 and the second connection point 14 in the second coolant sub-circuit 4. In addition, an optional flow restrictor 26 can be arranged between the first connection point 13 and the second connection point 14, in particular between the fourth circulation valve 25 and the second connection point 14. The third circulation valve 24 and the fourth circulation valve 25 are particularly preferably each designed as a circulation check valve.

It is preferably provided that the connecting valve 10 opens in the direction of the first coolant sub-circuit 3. Additionally or alternatively, it is provided that the first circulation valve 17 opens in a direction that leads from the first device 6 via the first circulation valve 17 in the direction of the first coolant pump 5. In other words, the first circulation valve 17 opens when there is a flow starting from the connection point 16 in the direction of the connection point 15. The connection point 15 is present in this case on the side of the first coolant pump 5 facing away from the first device 6 and the connection point 16 is present on the side of the first device 6 facing away from the first coolant pump 5.

The branch line valve 21 preferably opens when there is flow through the branch line 18 starting from the first connection point 13 toward the branching point 19. The second circulation valve 22 opens when there is flow from the connection point 23 toward the second connection point 14, the third circulation valve 24 opens when there is a flow from the branching point 19 toward the second connection point 14, and the fourth circulation valve 25 opens when there is a flow from the second connection point 14 in the direction of the first connection point 13. The check valves 10, 17, 21, 22, 24, and 25 each close in the other direction in this case, i.e., with reversed flow direction.

At least one of the coolant pumps 5 and 8 is provided as a fluid pump having variable delivery direction, in the case illustrated here as a screw pump, while in contrast the respective other one can preferably be provided as a flow pump, rotary piston pump, or piston pump. For example, one of the coolant pumps 5 and 8 is designed as a centrifugal pump. However, both coolant pumps 5 and 8 are particularly preferably each embodied as a fluid pump having variable delivery direction, in particular as a screw pump.

During operation of the coolant circuit 1, one operating parameter is selected from different operating parameters of at least one of the coolant pumps 5 and 8 and set thereon. Such an operating parameter is particularly preferably selected for each of the coolant pumps 5 and 8 and set thereon. The operating parameter in particular comprises speed and/or rotational direction. For example, for each of the coolant pumps 5 and 8, the operating parameter to be set is selected from the following operating parameters: first rotational direction or first delivery direction, second rotational direction or second delivery direction, and standstill.

The first rotational direction is opposite to the respective second rotational direction in this case or vice versa. The first delivery direction is provided with the first rotational direction and the second delivery direction is provided with the second rotational direction. At a standstill, the respective coolant pumps 5 and 8 preferably interrupt a coolant flow completely or at least almost completely. The arrows 27 and 28 each indicate the first delivery direction for the coolant pumps 5 and 8 and the arrows 29 and 30 each indicate the second delivery direction.

In a first operating mode, the delivery directions indicated by the arrows 27 and 28 are provided. The speeds of the coolant pumps 5 and 8 are selected such that an exchange of coolant between the coolant sub-circuits 3 and 4 is prevented by the connecting valve 10. Accordingly, the coolant sub-circuits 3 and 4 are operated completely separately from one another; circulation of the coolant occurs therein completely independently of one another. With the first delivery directions of the coolant pumps 5 and 8 indicated by the arrows 27 and 28, the branch line valve 21 moreover prevents flow through the branch line 8. The heat exchanger 20 thus does not have flow through it.

In a second operating mode, the delivery direction of the second coolant pump 8 is reversed. The first delivery direction indicated by the arrow 27 is thus still provided for the first coolant pump 5 and the second delivery direction indicated by the arrow 30 is provided for the second coolant pump 8. The speed of the coolant pumps 5 and 8 is furthermore selected such that an exchange of coolant does not occur between the coolant sub-circuits 3 and 4. Due to the second delivery direction of the second coolant pump 8, however, the branch line valve 21 opens, so that the coolant from the second coolant sub-circuit 4 at least partially flows through the heat exchanger 20.

For a third operating mode, the delivery directions of the coolant pumps 5 and 8 are indicated by the arrows 29 and 30. The second delivery directions are now provided both for the first coolant pump 5 and also for the second coolant pump 8. In this delivery direction of the first coolant pump 8, the first circuit valve 17 closes, whereas the connecting valve 10 opens. The coolant from the second coolant circuit 4 thus flows not only through the second device 9, but rather also additionally the first device 6. Because the branch line valve 21 is also open in the third operating mode, there is also flow through the heat exchanger 20.

In a fourth operating mode, the second delivery direction is provided for the first coolant pump 5 and the first delivery direction is provided for the second coolant pump 8, as indicated by the arrows 28 and 29. The first circulation valve 17 is also closed in this operating mode, so that coolant from the second coolant sub-circuit 4 flows not only through the second device 9, but rather additionally also the first device 6. Due to the first delivery direction of the second coolant pump 8, however, the branch line valve 21 closes, so that the heat exchanger 20 does not have fluid flowing through it.

In a fifth operating mode, the first coolant pump 5 is at a standstill, whereas the second coolant pump 8 has the first delivery direction (arrow 28). The first circulation valve 17 is open in this operating mode, so that coolant from the second coolant sub-circuit 4 flows through it while bypassing the first device 6. Due to the first delivery direction of the second coolant pump 8, the branch line valve 21 is closed.

In a sixth operating mode, the first coolant pump 5 is still at a standstill, whereas the second delivery direction (arrow 30) is provided for the second coolant pump 8. The first circulation valve 17 is also open in this operating mode, so that coolant from the second coolant sub-circuit 4 flows through it while bypassing the first device 6. Due to the second delivery direction of the second coolant pump 8, however, the branch line valve 21 is open, so that the heat exchanger 20 has coolant flowing through it.

In a seventh operating mode, the first coolant pump 5 is operated using the first delivery direction (arrow 27), whereas the second coolant pump 8 is at a standstill. In this operating mode, only the first coolant sub-circuit 3 has coolant flowing through it, because the first circulation check valve 17 is open, but the connecting valve 10 is closed.

In an eighth operating mode, the first coolant pump 5 has the second delivery direction (arrow 29), whereas the second coolant pump 8 is at a standstill. In this operating mode, the first circulation check valve 17 is closed. For this purpose, the branch line valve 21, the third circulation valve 24, and the connecting valve 10 open, so that coolant flows from the first coolant sub-circuit 3 through the branch line 8 and thus through the heat exchanger 20.

In modifications of the described operating modes, it can be provided that the speeds or delivery rates of the coolant pumps 5 and 8 are selected in such a way that an exchange of coolant occurs between the coolant sub-circuits 3 and 4, i.e., the connecting valve 10 is open. For example, for each of the mentioned operating modes, in which one of the coolant pumps 5 and 8 is not at a standstill, it can be provided that one of the coolant pumps 5 and 8 is operated at significantly higher speed or delivery rate than the respective other one of the coolant pumps 5 and 8. For example, the first coolant pump 5 is operated at higher speed than the second coolant pump or vice versa.

This is to be understood in particular to mean that the speeds or delivery rates of the coolant pumps 5 and 8 are selected in such a way that coolant is exchanged between the coolant sub-circuits 3 and 4. These enables, for example, heat of the second device 9 to be supplied to the first device 6 without heating it up. Expressed more generally, the speeds or delivery rates of the coolant pumps 5 and 8 can be selected in such a way that a specific coolant mass flow occurs through the connecting valve, wherein the determined coolant flow can also be zero or is greater than zero.

Overall, the coolant circuit 1 is constructed extremely simply, in particular it dispenses with active devices, in particular active switching valves, preferably completely. The setting of the different operating mode is implemented by different operating parameters of the coolant pumps 5 and 8, wherein the valves 10, 17, 21, 22, 24, and 25 operating solely passively—in the illustrated exemplary embodiment—control the flow of coolant through the coolant sub-circuits 3 and 4. Overall, the coolant circuit 1 is characterized by high energy efficiency.

The invention claimed is:

1. A coolant circuit for a drive device, comprising:
   a first coolant sub-circuit and a second coolant sub-circuit, in each of which a device to be temperature-controlled is arranged,
   wherein at least one coolant pump is present in each of the two coolant sub-circuits, which is designed in at least one of the coolant sub-circuits as a fluid pump having variable delivery direction,
   wherein the first coolant sub-circuit and the second coolant sub-circuit are fluidically connected to one another via a first connection, the first connection comprising at least one connecting valve,
   wherein the first coolant sub-circuit and the second coolant sub-circuit are further fluidically connected to one another via a second connection, separate from the first connection, the second connection comprising a connecting line with least a flow restrictor,
   wherein the second cooling sub-circuit comprises a first and a second junction, and the first cooling sub-circuit comprises a fourth and a fifth junction,
   wherein the first connection joins the second and fifth junctions, and the second connection joins the first and fourth junctions,
   wherein the second coolant sub-circuit comprises a second check valve which fluidically bypasses the at least one coolant pump and the device to be temperature-controlled of the second coolant sub-circuit, and
   wherein the second check valve bridges the second junction to a point along the second coolant sub-circuit which is opposite the at least one coolant pump and the device to be temperature-controlled of the second coolant sub-circuit from the second junction.

2. The coolant circuit as claimed in claim 1, wherein the at least one connecting valve of the first connection is a check valve which is oriented to permit flow only from the second coolant sub-circuit to the first coolant sub-circuit.

3. The coolant circuit as claimed in claim 2, wherein a branch line branches off from the second coolant sub-circuit at a third junction and rejoins the second coolant sub-circuit at the first junction, and
   wherein the branch line comprises at least one heat exchanger and/or a branch line valve.

4. The coolant circuit as claimed in claim 3, wherein the second coolant sub-circuit comprises:
   a second check valve which fluidically bypasses the at least one coolant pump and the device to be temperature-controlled of the second coolant sub-circuit;
   a third check valve which is fluidically arranged between the third junction and the second junction; and
   a fourth check valve which is fluidically arranged between the first junction and the third junction.

5. The coolant circuit as claimed in claim 4, wherein the second check valve is oriented to permit flow only from the point along the second coolant sub-circuit to the second junction,
   wherein the third check valve is oriented to permit flow only from the third junction to the second junction, and
   wherein the fourth check valve is oriented to permit flow only from the second junction to the first junction.

6. The coolant circuit as claimed in claim 5, wherein a first check valve is arranged on the first coolant sub-circuit between the fourth and fifth junctions, in parallel with the at least one coolant pump and the device to be temperature-controlled of the first coolant sub-circuit, and
   wherein the first check valve is oriented to permit flow only from the fifth junction to the first junction.

7. The coolant circuit as claimed in claim 1, wherein a first check valve is arranged in the first coolant sub-circuit and is fluidically connected in series with the at least one coolant pump and the device to be temperature-controlled of the first coolant sub-circuit.

8. The coolant circuit as claimed in claim 1, wherein a branch line branches off from the second coolant sub-circuit at a third junction and rejoins the second coolant sub-circuit at the first junction.

9. The coolant circuit as claimed in claim 8, wherein the branch line comprises at least one heat exchanger and/or a branch line valve.

10. The coolant circuit as claimed in claim 1, wherein a fourth check valve is fluidically arranged on the second coolant sub-circuit between the first junction and the third junction.

11. The coolant circuit as claimed in claim 10, wherein the fourth check valve is oriented to permit flow only from the second junction to the first junction.

12. The coolant circuit as claimed in claim 11, wherein a flow restrictor is provided upstream of the fourth check valve and downstream of the second junction.

13. The coolant circuit as claimed in claim 1, wherein the second check valve is oriented to permit flow only from the point along the second coolant sub-circuit to the second junction.

14. The coolant circuit as claimed in claim 1, wherein a branch line branches off from the second coolant sub-circuit at a third junction and rejoins the second coolant sub-circuit at the first junction, and
   wherein a third check valve is fluidically arranged on the second coolant sub-circuit between the third junction and the second junction.

15. The coolant circuit as claimed in claim 14, wherein the third check valve is oriented to permit flow only from the third junction to the second junction.

16. A method for operating a coolant circuit for a drive device, comprising:
- providing a first coolant sub-circuit and a second coolant sub-circuit, in each of which a device to be temperature-controlled and is at least one coolant pump designed to have variable delivery direction are arranged,
- selecting one operating parameter from a plurality of operating parameters of at least one of the coolant pumps, and
- setting the at least one coolant pump according to the selected operating parameter,
- wherein the first coolant sub-circuit and the second coolant sub-circuit are fluidically connected to one another via a first connection, the first connection comprising at least one connecting valve,
- wherein the first coolant sub-circuit and the second coolant sub-circuit are further fluidically connected to one another via a second connection, separate from the first connection, the second connection comprising a connecting line with least a flow restrictor,
- wherein the second cooling sub-circuit comprises a first and a second junction, and the first cooling sub-circuit comprises a fourth and a fifth junction,
- wherein the first connection joins the second and fifth junctions, and the second connection joins the first and fourth junctions,
- wherein the second coolant sub-circuit comprises a second check valve which fluidically bypasses the at least one coolant pump and the device to be temperature-controlled of the second coolant sub-circuit, and
- wherein the second check valve bridges the second junction to a point along the second coolant sub-circuit which is opposite the at least one coolant pump and the device to be temperature-controlled of the second coolant sub-circuit from the second junction.

17. A coolant circuit for a drive device, comprising:
- a first coolant sub-circuit and a second coolant sub-circuit, in each of which a device to be temperature-controlled is arranged,
- wherein at least one coolant pump is present in each of the two coolant sub-circuits, which is designed in at least one of the coolant sub-circuits as a fluid pump having variable delivery direction,
- wherein the first coolant sub-circuit and the second coolant sub-circuit are fluidically connected to one another via a first connection, the first connection comprising at least one connecting valve, and
- wherein the first coolant sub-circuit and the second coolant sub-circuit are further fluidically connected to one another via a second connection, separate from the first connection, the second connection comprising a connecting line with least a flow restrictor,
- wherein the second cooling sub-circuit comprises a first and a second junction, and the first cooling sub-circuit comprises a fourth and a fifth junction,
- wherein the first connection joins the second and fifth junctions, and the second connection joins the first and fourth junctions, and
- wherein a fourth check valve is fluidically arranged on the second coolant sub-circuit between the first junction and the third junction.

* * * * *